United States Patent [19]

Faroudja

[11] Patent Number: 5,305,120
[45] Date of Patent: Apr. 19, 1994

[54] TELEVISION CROSS COLOR SUPPRESSION AND CHROMINANCE NOISE REDUCTION

[76] Inventor: Yves C. Faroudja, 26595 Anacapa Dr., Los Altos Hills, Calif. 94022

[21] Appl. No.: 874,190

[22] Filed: Apr. 24, 1992

[51] Int. Cl.$^5$ .......................... H04N 9/64; H04N 9/77; H04N 9/78

[52] U.S. Cl. .................................... 348/624; 348/665; 348/713

[58] Field of Search ...................... 358/31, 36, 40, 167, 358/105, 133, 37, 166, 162; H04N 9/77, 9/78, 9/64

[56] References Cited

U.S. PATENT DOCUMENTS

| | | | |
|---|---|---|---|
| 4,179,705 | 12/1979 | Faroudja | 358/31 |
| 4,240,105 | 12/1980 | Faroudja | 358/31 |
| 4,706,112 | 11/1987 | Faroudja et al. | 358/31 |
| 4,733,297 | 3/1988 | Katsumata et al. | 358/105 |
| 4,754,322 | 6/1988 | Okuda et al. | 358/31 |
| 4,864,389 | 9/1989 | Faroudja et al. | 358/31 |
| 4,967,271 | 10/1990 | Campbell et al. | 358/105 |
| 5,023,713 | 6/1991 | Nishigori | 358/105 |
| 5,099,329 | 3/1992 | Oyama et al. | 358/167 |
| 5,122,876 | 6/1992 | Aoki | 358/133 |
| 5,260,775 | 11/1993 | Faroudja | 358/36 |

Primary Examiner—James J. Groody
Assistant Examiner—John Miller
Attorney, Agent, or Firm—Thomas A. Gallagher; David N. Lathrop

[57] ABSTRACT

Cross color from composite television signals is suppressed by averaging baseband chrominance samples spaced a certain number of frames apart, or when motion is detected in the television signals, by averaging baseband chrominance samples spaced a certain number of lines apart. Cross color suppression when motion is detected may be improved by low-pass filtering the line-spaced chrominance sample average. Both NTSC and PAL implementations are presented.

21 Claims, 3 Drawing Sheets

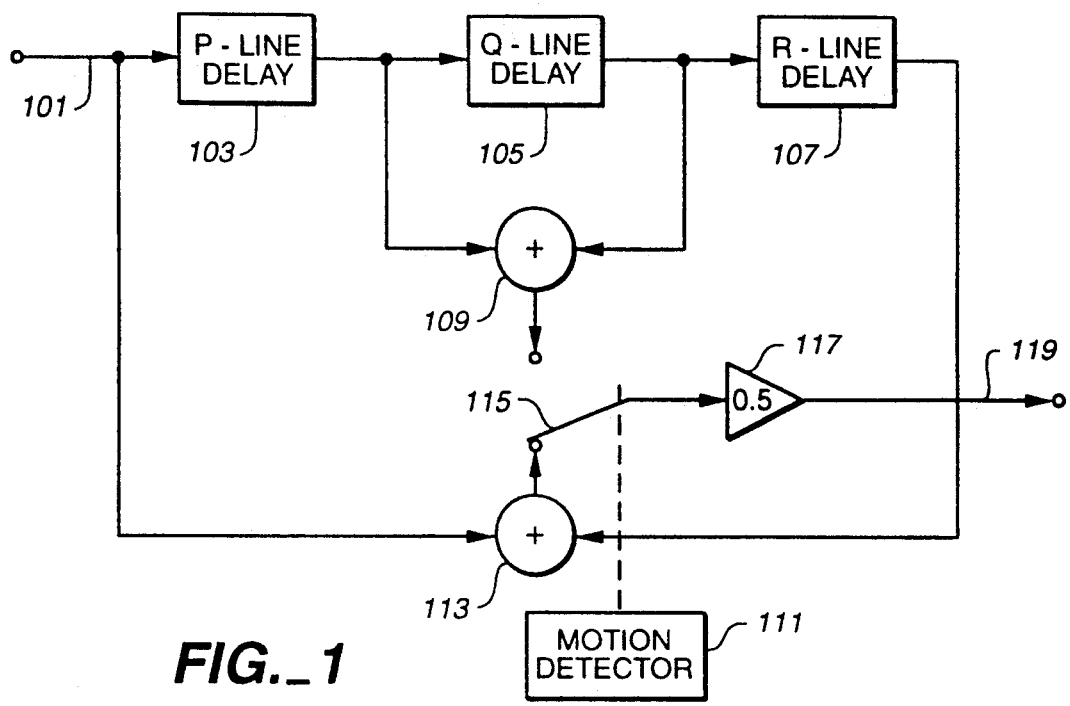
FIG._1
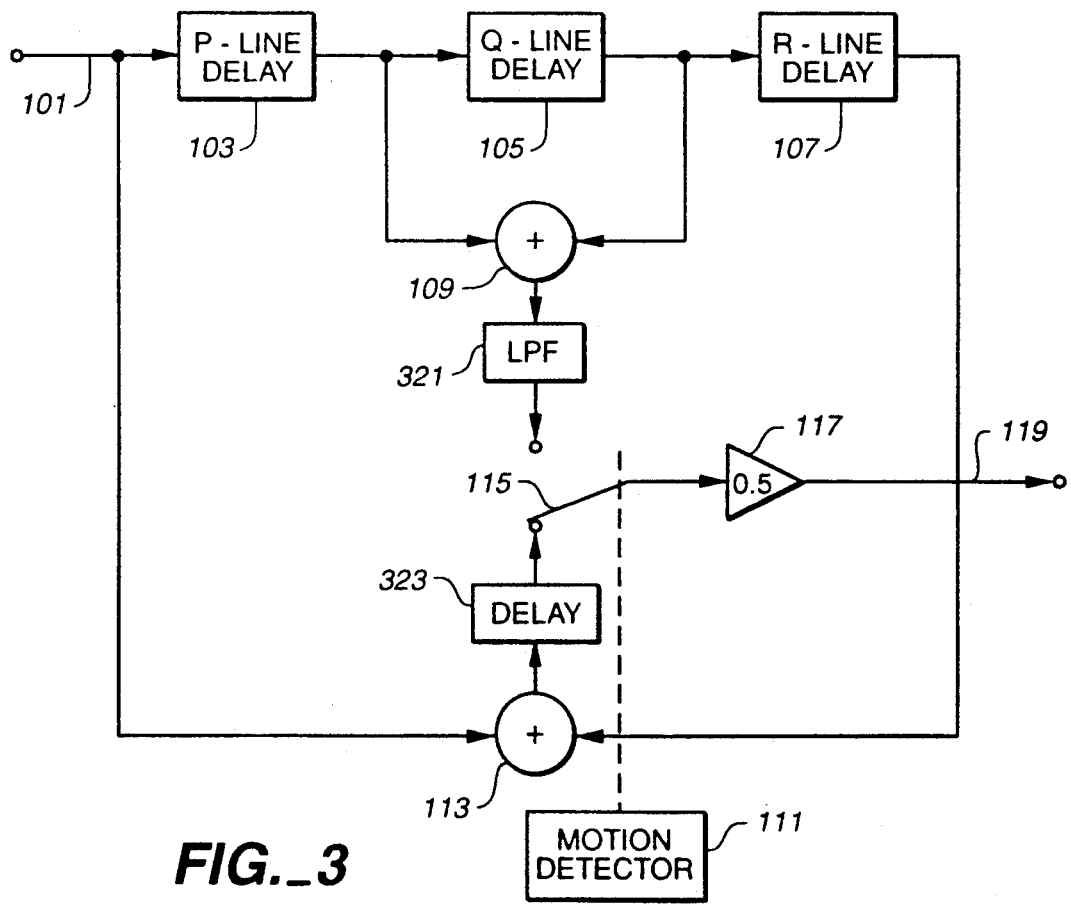
FIG._3

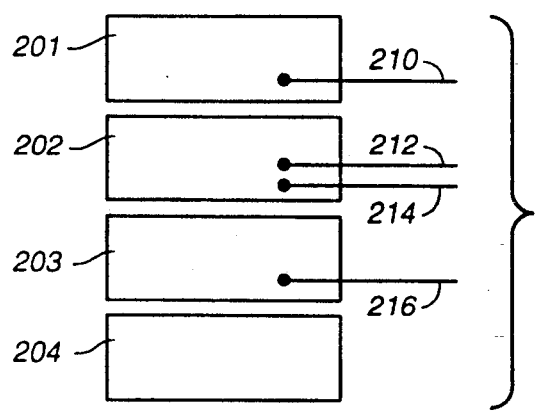
FIG._2
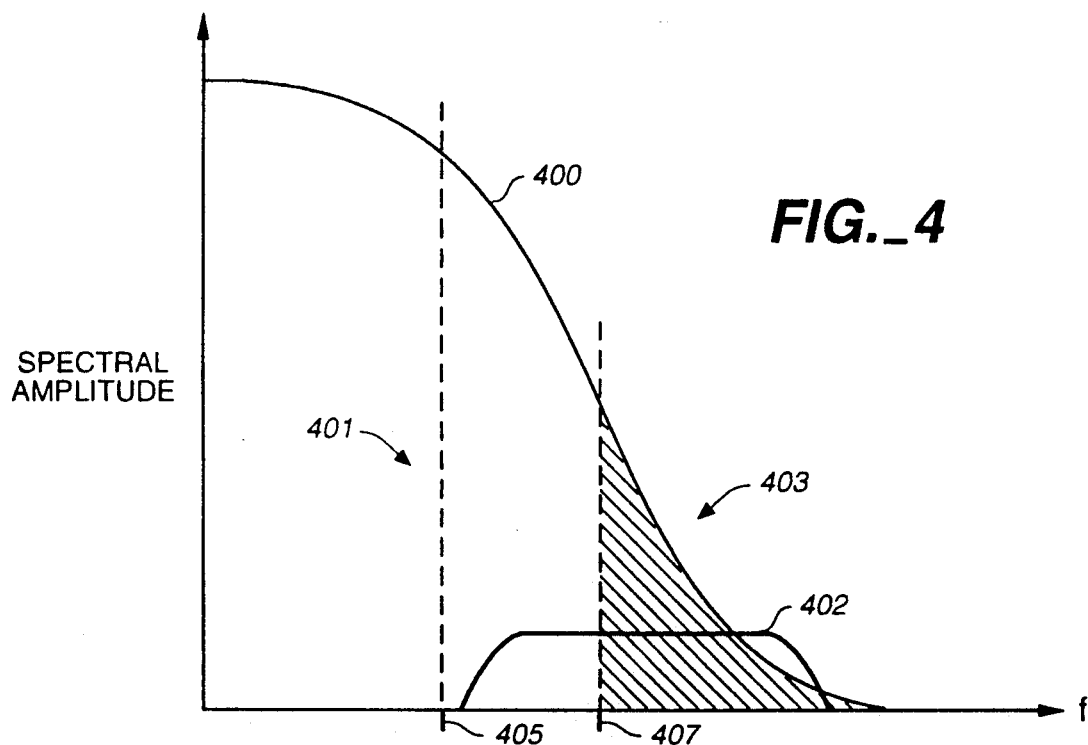
FIG._4
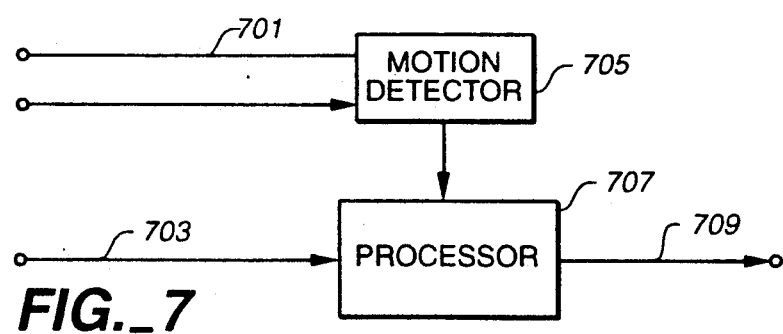
FIG._7

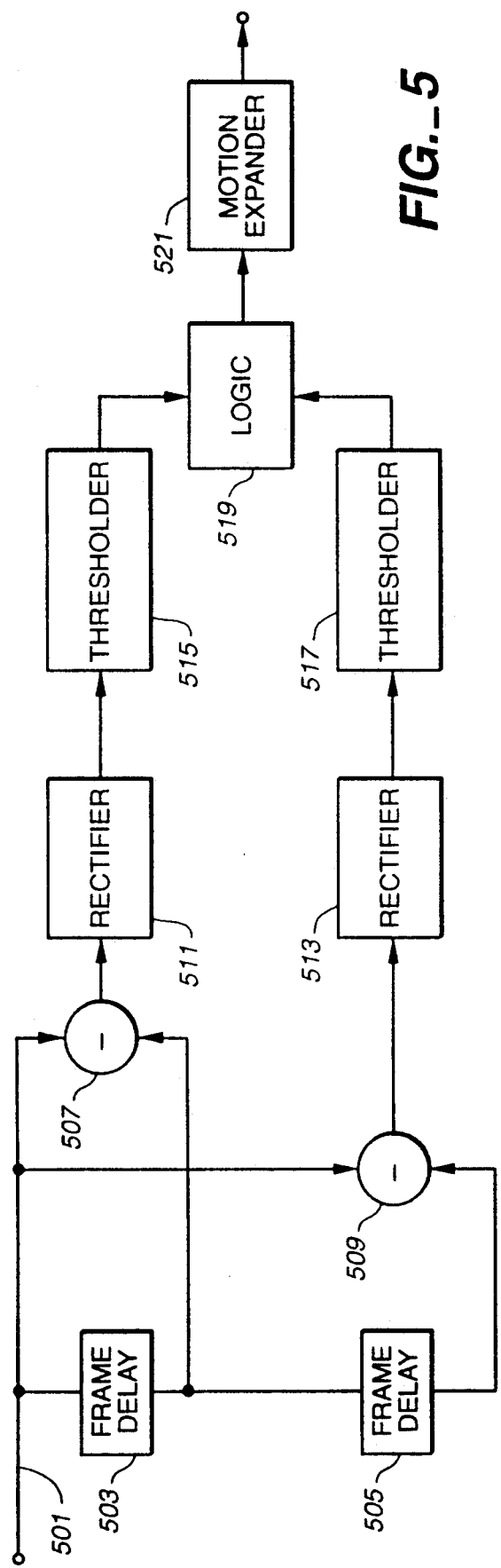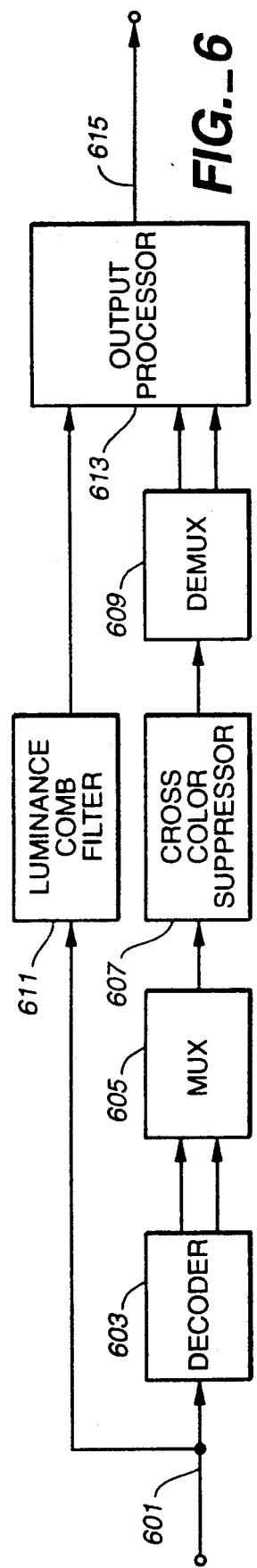
FIG._5
FIG._6

TELEVISION CROSS COLOR SUPPRESSION AND CHROMINANCE NOISE REDUCTION

TECHNICAL FIELD

This invention relates generally to improving the subjective quality of a television picture. More particularly the invention relates to reducing or eliminating corruption of the chrominance spectrum in composite video signals caused by the misinterpretation of luminance information as chrominance information. The invention also achieves some reduction in chrominance noise.

BACKGROUND

In composite video television systems such as NTSC and PAL, luminance and chrominance information share a portion of the total signal bandwidth. In NTSC, for example, chrominance information is encoded on a subcarrier of 3.579545 MHz. Within the chrominance band which extends from roughly 2.3 MHz to 4.2 MHz, both the chrominance and luminance spectra are intermingled.

A television decoder extracts both luminance spectral information and chrominance spectral information from the composite signal; however, a simple conventional television decoder cannot discern which of the higher frequency components are luminance information and which are chrominance information. As a result, these decoders generate incorrect chrominance information based upon the luminance spectrum. The term "cross color" refers to corruption of the chrominance spectrum caused by the misinterpretation of high-frequency luminance information as chrominance information. Conversely, the term "cross luminance" refers to corruption of the luminance spectrum by the misinterpretation of chrominance information as high-frequency luminance information.

Cross color is more apparent for certain images. For example, a tweed jacket of a television announcer may cause a television decoder to incorrectly produce a lot of shiny chrominance information. As another example, large vertical or substantially vertical transitions are often accompanied by bands of red and green color like a rainbow along the edge of the transitions.

Historically, it has not been very important to go to great lengths to reduce cross color because television screens were small and not very bright. But because screens are becoming larger and brighter, and because various picture enhancement techniques such as line doubling which eliminate a lot of other artifacts are becoming more common place, cross color is becoming much more noticeable and very objectionable. It has become very important to reduce cross color more efficiently. Examples of decoders in the prior art which incorporate some form of more intelligent cross color suppression schemes are set forth in U.S. Pat. Nos. 4,179,705, 4,240,105, 4,706,112, and 4,864,389.

Prior art methods reduce cross color by operating upon chrominance information encoded on the chrominance subcarrier prior to demodulation into baseband chrominance information. These methods typically incorporate cross color suppression into the decoding process, focusing on improving the separation of the chrominance and luminance information to reduce both cross color and cross luminance.

A primitive technique in the prior art teaches separating chrominance and luminance using a combination of a notch filter passing lower-frequency spectral components as luminance information and a high-frequency bandpass filter (BPF) passing higher-frequency spectral components as chrominance information. The chrominance information is subsequently quadrature-demodulated into two components such as, for example, I and Q information, or R−Y and B−Y information. The luminance and the two chrominance components are matrixed together to generate the Red, Green, and Blue (RGB) signals needed to drive conventional analog television display systems. In NTSC systems using a BPF from about 2.3 to about 4.5 MHz, all higher-frequency luminance information is passed together with the chrominance information. Cross color is very heavy.

A better approach uses comb filters to separate chrominance and luminance. The comb filter exploits the fact that, in most color television systems, luminance energy in the vicinity of the chrominance subcarrier is most probably located near harmonics of the line scanning frequency, say 15 kHz, while chrominance information is located between the luminance information. The sidebands of the luminance and chrominance information will usually overlap somewhat.

The comb filter typically has two response characteristics: one response for the luminance path and a second response for the chrominance path. This technique for separating luminance and chrominance is superior to the primitive technique described above, but it works well only when the luminance information is concentrated around harmonics of the line scanning frequency, or when the luminance information is of a vertical nature. As a result, this technique works well for vertical bars, for example, but it does not work very well for diagonal bars which cause both the chrominance and luminance spectra to spread and mix, thereby causing cross color.

Comb filter decoding of diagonal bars can be improved by filtering in the time domain using frame memory rather than filtering in the line domain using line memory. The technique is applicable to various video standards such as NTSC and PAL.

The prior art also teaches reducing cross color by averaging chrominance information across successive frames or lines using comb filters or by recirculation of frame, field, or line periods of chrominance information. As mentioned above, such techniques are generally combined with the process of decoding or separating luminance information and chrominance information prior to demodulation of the chrominance information into the baseband domain. The averaging coefficients and the recirculation coefficients are typically adapted in response to the presence of vertical transitions or motion in the television picture to prevent blurring of chrominance information in either the vertical or the temporal domains. Examples of averaging and recirculation techniques are discussed more fully in U.S. Pat. No. 4,443,817 which is hereby incorporated by reference in its entirety.

In NTSC systems, for example, the chrominance subcarrier phase rotates by 180 degrees between successive frames. This rotation causes luminance information to be misinterpreted as chrominance information which oscillates between two complementary colors such as red and green; that is, the luminance appears to be spectral energy which oscillates between two colors represented by chrominance information 180 degrees out of phase with each other. By averaging the chrominance information in two successive frames, the out-of-phase cross color information cancels thereby allowing chrominance information to be obtained which is free of cross color; however, this technique only works when the picture is stationary. When one or more objects in the picture image are moving, the amount of one-to-one correlation between luminance information in successive frames is so low that cross color suppression is difficult to do and expensive to implement. Therefore, comb filtering in the time domain does not suppress cross color very well for pictures containing objects in motion.

Cross color suppression in the prior art is difficult to accomplish in applications such as home video cassette recorders in which no stable clock or timing signal is available. In such recorders, for example, the chrominance subcarrier and the frame synchronization signal are independent; the frequencies of these two signals are allowed to vary independently. There is a need, therefore, to provide for cross color suppression without relying upon any particular clock or timing signal.

In addition, cross color suppression is very desirable in applications where only demodulated baseband chrominance information is available, especially where demodulation was performed without much regard for suppressing cross color. In such applications, for practical reasons, cross color suppression must be performed in the baseband domain.

SUMMARY DESCRIPTION OF INVENTION

It is an object of the present invention to provide for improved cross color suppression for both stationary picture images and picture images containing moving objects.

It is another object of the present invention to provide for cross color suppression in a demodulated baseband chrominance signal.

It is yet another object of the present invention to provide for a cross color suppression apparatus which is relatively inexpensive to implement.

It is a further object of the present invention to provide for cross color suppression for a variety of composite video standards such as NTSC and PAL.

It is yet a further object of the present invention to provide for cross color suppression which may operate at an independent clock rate.

In accordance with the teachings of the present invention, cross color suppression is performed by averaging baseband chrominance information over a certain number of frames when no motion is detected in the picture image and progressively switching to averaging baseband chrominance information over a certain number of scanning lines when motion is detected.

Alternatively, in accordance with the teachings of the present invention, cross color suppression is performed by recirculation of baseband chrominance information around a certain number of frames when no motion is detected in the picture image and progressively switching to recirculation of baseband chrominance information around a certain number of scanning lines when motion is detected.

Also in accordance with the teachings of the present invention, cross color suppression is performed by averaging a low-pass filtered representation of chrominance information over a certain number of scanning lines.

Alternatively, also in accordance with the teachings of the present invention, cross color suppression is performed by recirculation of a low-pass filtered representation of chrominance information around a certain number of scanning lines.

Further in accordance with the teachings of the present invention for NTSC systems, chrominance information is averaged over one frame when no motion is detected and over one line when motion is detected; for PAL systems, chrominance information is averaged over two frames when no motion is detected and over two lines when motion is detected.

Alternatively, further in accordance with the teachings of the present invention for NTSC systems, chrominance information is recirculated around one frame when no motion is detected and around one line when motion is detected; for PAL systems, chrominance information is recirculated around two frames when no motion is detected and around two lines when motion is detected.

According to the teachings of the present invention, no close association is required with the chrominance subcarrier frequency, the line scanning frequency, the frame synchronization frequency, or the frequency of any other timing signal. Cross color may be performed independently of these signals.

Embodiments of television decoders incorporating the present invention need not perform cross luminance reduction together with cross color suppression. Cross luminance and cross color may be reduced independently of each other, if at all, and are preferably performed in separate parallel paths. One skilled in the art should appreciate that chrominance processing delays must be closely matched to luminance processing delays if a high-quality picture is to be obtained.

In addition, the present invention reduces chrominance noise by approximately 3 dB.

Objects and advantages of the present invention in addition to those discussed here are set forth throughout this description and particularly below in the Detailed Description of Embodiments.

BRIEF DESCRIPTION OF THE DRAWINGS

FIG. 1 is a block diagram illustrating a basic structure incorporating an embodiment of the present invention.

FIG. 2 is hypothetical graphical representation of the relationship between the baseband chrominance samples averaged across successive frames and successive lines at any given instant in time.

FIG. 3 is a block diagram illustrating a basic structure incorporating an embodiment of the present invention further comprising a low-pass filter and matching delay element.

FIG. 4 is a hypothetical graphical representation of the spectral envelopes of luminance and chrominance energy in a composite NTSC signal.

FIG. 5 is a block diagram illustrating the basic structure of a simple motion detector utilized with one embodiment of the present invention.

FIG. 6 is a block diagram illustrating a portion of a television receiver incorporating an embodiment of the present invention.

FIG. 7 is a block diagram illustrating conceptually that the present invention provides in response to detection of motion in a television picture cross color suppression for demodulated baseband chrominance information.

DETAILED DESCRIPTION OF EMBODIMENTS

FIG. 7 illustrates the concept of the present invention. Motion detector 705 receives luminance and/or chrominance information from path 701; processor 707 receives demodulated baseband chrominance information from path 703 and a motion control signal from motion detector 705 and generates baseband chrominance information substantially free of cross color along path 709.

Processor 707 submits the baseband chrominance information received from path 703 to an averaging or, alternatively, to a recirculation process. Such process is adapted in response to motion control information received from motion detector 705 to avoid visible blurring of chrominance information in the presence of motion.

The following detailed description of embodiments discusses only specific examples of implementation of the concept shown in FIG. 7; application of the present invention is not limited to these specific examples. These examples are more particularly directed toward implementations which combine chrominance information across successive frames and/or scanning lines by utilizing a feed-forward delay structure; however, it should be appreciated by one skilled in the art that similar implementations may be accomplished using recirculation techniques as discussed above. Preferred embodiments are discussed where appropriate.

FIG. 1 illustrates a basic structure incorporating one embodiment of the present invention. Baseband chrominance information is received along path 101 where it is presented to adder 113 and to p-line delay 103 which delays chrominance information by p scanning lines; the output of p-line delay 103 is passed to adder 109 and to q-line delay 105 which provides a delay of q scanning lines; the output of q-line delay 105 is passed to adder 109 and to r-line delay 107 which provides a delay of r scanning lines; the output of r-line delay 107 is passed to adder 113; switch 115 switches between the outputs of adders 109 and 113 in response to information received from motion detector 111 and passes a signal to amplifier 117 which weights it by one-half, thereby obtaining substantially the same amplitude as the chrominance information received from path 101, and passes the resultant average along path 119. The specific implementation of motion detector 111 and amplifier 117 are beyond the scope of the present invention. Amplifier 117 is not required to practice the present invention.

The combined delay of p-line delay 103, q-line delay 105 and r-line delay 107 equals the delay of an integral number n of television picture frames.

Switch 115 may select from among two or more discrete states or can operate as a continuous fader which progressively switches between the outputs of the two adders, passing a weighted sum of the two adder outputs to amplifier 117. Although a switch with more than two states is preferred, for ease of discussion, the present invention is first described utilizing a two-state switch.

Implementation of the present invention for use with NTSC signals is discussed first before an alternative implementation is discussed for use with PAL signals.

NTSC Implementation

In NTSC, the chrominance subcarrier reverses phase on a frame-to-frame basis. As a result, cross color also reverses phase from one frame to the next frame. If no motion is detected in the luminance information and if high-frequency luminance information creates, for example, a red artifact in the chrominance information for a given frame, then for the next frame the luminance information will create an artifact in a complementary color, green in this example.

The cross color in NTSC oscillates at one-half the frame rate, or 15 Hz, alternating between colors of opposite phase. The cycle repeats every two frames. If the demodulated baseband chrominance is averaged over two successive frames, then cross color is eliminated for stationary objects.

Referring to FIG. 1, for NTSC implementations, delays 103, 105 and 107 delay the baseband chrominance information received along path 101 by a total of one frame or 525 lines. Adder 113 combines chrominance information from two successive frames. Throughout the following discussion, adder 113 is referred to as a "frame adder" but it should be understood that this adder does not sum complete frames; rather, for NTSC implementations, it sums individual samples of chrominance information which are separated by exactly one frame.

Assuming no motion is detected, switch 115 passes the output of frame adder 113 to amplifier 117 which weights the summed information by one-half, thereby obtaining the average of the chrominance information across two successive frames.

The format of the baseband chrominance information received along path 101 is not critical to the practicing of the present invention; however, in one embodiment, such baseband information is a multiplexed sequence of 8-bit values representing, for example, either I and Q or R−Y and B−Y samples. In an alternative embodiment, the two components of the baseband chrominance information are processed in separate parallel paths; for example, a sequence of I samples are processed in one path and a sequence of Q samples are processed in a second path.

Typically, the multiplexed samples arrive at a clock rate of approximately 14 MHz derived, for example, from either four times the frame rate or 910 times the line scanning rate. The exact rate is not important to the practicing of the invention. It could be at yet another rate.

When no motion is detected, chrominance information is essentially blurred in time for a period of one frame but cross color is completely suppressed. Because there is no motion, the blurring is not noticeable.

When sufficient motion is detected, however, the blurring of chrominance information becomes objectionable and some other form of cross color suppression is needed.

Cross color may be suppressed without blurring in the presence of motion by averaging chrominance information across two successive lines instead of across two successive frames. In NTSC, chrominance information reverses phase from line to line. Therefore, to the extent two successive lines contain correlated luminance information, line averaging will cancel cross color. Luminance information between adjacent lines is correlated for vertical patterns, therefore even in the presence of motion, the present invention will suppress the cross color of vertical patterns. Horizontal patterns do not create much if any cross color because they contain little if any high-frequency luminance information. Thus, the only significant cross color which remains is due to diagonal patterns.

Although cross color can be minimized without blurring, averaging the chrominance information across two successive lines will reduce vertical resolution. Fortunately, this loss in vertical resolution is tolerable because, as is well known, the chrominance vertical resolution of NTSC is much greater than what the eye requires when there is motion for satisfactory high-quality pictures. At the point of motion within a frame, the present invention averages the chrominance information in two successive lines located midway between the lines otherwise averaged across two fields as explained above.

Referring to FIG. 1, for NTSC implementations, delays 103 and 107 each delay the baseband chrominance information by a period of 262 lines and delay 105 delays the baseband chrominance information by one line. Adder 109 combines chrominance information for two successive lines. Throughout the following discussion, adder 109 is referred to as a "line adder" but it should be understood that this adder does not sum complete lines; rather, for NTSC implementations, it sums individual samples of chrominance information which are separated by exactly one line.

Assuming that motion is detected, switch 115 passes the output of line adder 109 to amplifier 117 which weights the summed information by one-half, thereby obtaining the average of the chrominance information across two successive lines.

It is important to note that the time of the line averaged chrominance information is identical to the time of the frame averaged chrominance information. That is, the location in the time domain of the output of line adder 109 is identical to the location of the output of frame adder 113. This temporal alignment may be better understood by referring to FIG. 2.

For NTSC implementations, FIG. 2 illustrates two successive frames of baseband chrominance information, each frame comprising two fields. Block 201 represents field 0 of frame 1, block 202 represents field 1 of frame 1, block 203 represents field 0 of frame 2, and block 204 represents field 1 of frame 2. At some given instant in time, samples of chrominance information 210 and 216, which are exactly one frame or 525 lines apart, are being summed by frame adder 113. As mentioned above, frame adder 113 essentially blurs the chrominance information in time for a period of one frame and the average time of the blurred information is exactly midway between the times of samples 210 and 216.

At this same instant, samples of chrominance information 212 and 214 which are exactly one line apart are being summed by line adder 109. Line adder 109 blurs chrominance information for a period of one line and the average time of this blurred information is exactly midway between the times of samples 212 and 214. Sample 212 lags behind sample 210 by 262 lines and sample 214 leads sample 216 by 262 lines; therefore, the average time of the frame-averaged samples and the average time of the line-averaged samples are identical.

This alignment in time is important because it means that switch 115 can select between the output of frame adder 113 and the output of line adder 109 without introducing any timing discrepancies in the chrominance information.

Operation of the present invention is very robust and tolerant of errors in evaluating whether motion is detected. If such errors do occur, they will not produce a catastrophic failure in the picture because the line-averaged chrominance information is aligned with the frame-averaged chrominance information in the time domain and in the vertical domain. Of course, there should also be no horizontal discrepancy; one skilled in the art should appreciate that the outputs of the frame adder and line adder must be aligned in the horizontal, vertical and time domains.

A further improvement in cross color reduction can be obtained by low-pass filtering the output of line adder 109 because cross color is extremely sensitive to the chrominance bandwidth. A basic structure of the present invention incorporating a low-pass filter (LPF) is shown in FIG. 3. The structure illustrated in FIG. 3 is the same as that shown in FIG. 1 with the addition of LPF 321 and matching delay 323.

The sensitivity of cross color to chrominance bandwidth can be better appreciated by referring to FIG. 4 which illustrates a typical spectrum of luminance and chrominance information in a composite NTSC video signal. Curve 400 shows the envelope of the luminance spectrum and curve 402 shows the envelope of the chrominance spectrum. Because the amplitude of the luminance spectrum typically drops off very rapidly at higher frequencies, the amplitude of cross color also drops off rapidly at higher frequencies. For example, as shown in FIG. 4, the small size of shaded area 403 which extends above line 407 and below curve 400 indicates that very little cross color energy exists above frequency 407. The size of area 401 which extends above line 405 and lies below curve 400, however, indicates that significantly more cross color energy exists above frequency 405. The visual effect of cross color is approximately proportional to the square of the chrominance bandwidth as measured from the high-frequency end of the chrominance band. By restricting the operation of the line adder to only the cross color frequencies passed by LPF 321, the vertical blurring caused by line averaging can be restricted to only that portion of the chrominance bandwidth in which most of the cross color energy exists.

The bandwidth of the chrominance path in a typical television receiver is roughly 1.2 to 1.5 MHz. By suppressing cross color in only the lower half of this bandwidth, approximately three-quarters of the original cross color energy can be eliminated. In a preferred embodiment of the present invention, the cutoff frequency for LPF 321 is around 500 to 700 kHz.

It is not necessary to low-pass filter the frame averaged chrominance information, but it is necessary to match the delay of the LPF to preserve the vertical and horizontal alignment of the averaged chrominance information through the motion and no-motion paths. Delay 323 provides this matching delay.

As discussed above and shown in FIGS. 1 and 3, the switching between frame averaging and line averaging occurs in response to the detection of motion within the picture image. The specific implementation of motion detector 111 is not critical to the practice of the present invention; however, there are several principles of good motion detection which should be followed. Adherence to these principles will help insure that the process to perform cross color suppression will never degrade but will sometimes improve the subjective quality of a picture.

First, a good motion detector should analyze both luminance and chrominance information and indicate the presence of motion if either type of information reveals that motion has occurred. Generally, luminance information is the better source for detecting motion, but there are cases where motion is manifested only by changes in the chrominance information. For example, a red veil moving across a grey background, where the grey-scale value of the veil is the same as the background, will cause very little variation in luminance information but will cause considerable variation in chrominance information. Logic in the motion detector should determine the amount of motion indicated by variations in both luminance information and in chrominance information and select the larger of the two.

Second, it is important to not underestimate motion or to be late in detecting motion because it is much preferred to have cross color artifacts rather than motion blurring.

Third, it is important to realize that motion cannot be detected reliably because only a succession of discrete snapshots or frames of the image in the television picture are available. Therefore, it is important to consider how the system will behave when actual motion is not detected. If there is any doubt whether motion is detected, it is important to assume motion exists. A moving object should not be deemed to be stationary.

Although details of implementing motion detection are not within the scope of the present invention, the basic structure of a typical motion detector for NTSC is shown in FIG. 5. Additional details concerning motion detection may be found in U.S. Pat. No. 4,967,271 which is hereby incorporated by reference in its entirety.

Referring to FIG. 5, a video signal comprising both luminance and chrominance information is received along path 501 and passed through frame delays 503 and 505; the difference in luminance information between two successive frames is determined by subtractor 507, rectified by rectifier 511, and compared to a reference value in thresholder 515; the difference in chrominance information between two frames spaced one frame apart is determined by subtractor 509, rectified by rectifier 513, and compared with another reference value in thresholder 517; logic 519 selects the larger of the two values received from both thresholders and passes the selected value to motion expander 521. Normally, motion expander 521 increases the size of the motion in the horizontal, vertical, and time domains by generating a three-dimensional space in which motion is deemed to be occurring. This space is referred to herein as a "motion control volume." Switch 115 selects the output of line adder 109 for all chrominance information related to television picture elements (pixels) within the motion control volume.

Ideally, delays in the television system incorporating the present invention should be controlled in such a way that each moving object is at the center of the motion control volume. The volume is defined along horizontal (H), vertical (V), and time (T) dimensions. That is, system delays should be controlled such that line averaging of chrominance information starts just before motion begins and stops just after motion ends in each of the three dimensions. This period of line averaging can be visualized as a three-dimensional volume centered about a point of motion in HVT space.

In practice, delays in the horizontal and vertical domains can be easily implemented fairly inexpensively, but delays in the time domain cannot be implemented as easily because time-domain memories are expensive. As a practical matter, therefore, the three-dimensional volume of motion does not start in the time domain until motion begins and stops shortly thereafter.

For example, suppose that motion is detected at point (x, y, z) in HVT space where z is the NTSC frame number, y is the line number within frame z, and x is the pixel number within line y at which motion occurs. Although it would be ideal to center the motion in time domain by starting line averaging in frame $z-1$ and ending line averaging in frame $z+1$, practical considerations required that line averaging start in frame z and end in frame $z+1$. Within these frames, motion is centered in the horizontal domain by performing line averaging during an interval approximately 1 microsecond long centered about pixel x, and motion is centered in the vertical domain by performing line averaging within these frames for this interval in each of lines $y-1$ through $y+1$.

The size of the motion control volume discussed above is only an example. Other sizes may be used in any or all of the three dimensions without departing from the scope of the present invention.

The description thus far has assumed switch 115 is a two-state switch in order to simplify the discussion. In a preferred embodiment of the present invention, switch 115 operates as a fader by progressively switching among a multiplicity of states between the signals coming from line adder 109 and frame adder 113, producing a weighted sum of the two signals at its output. For example, the output signal $X_O$ of switch 115 could be represented as $X_O = A \cdot X_F + (1-B) \cdot X_L$ where $X_F$ is the output of frame adder 113, $X_L$ is the output of line adder 109, and A is any value in the range from and including zero up to and including one. According to this example, a four-state switch could be implemented with A equal to one for motion, A equal to two-thirds for slight motion, A equal to one-third for additional motion, and A equal to zero for full motion.

Other implementations of switch 115 based on either analog or digital techniques may be used without departing from the scope of the present invention. The use of a switch with more than two states is especially important in implementations of the present invention for PAL television signals. Considerations for PAL implementations are discussed below.

It is important to note, however, that a switch between motion and no-motion cases should not introduce any switching transients into the chrominance information. These transients may be avoided or minimized by adhering to several guidelines. First, as discussed above, there should be no visible timing discrepancy between the motion and no-motion paths in the vertical, horizontal, or time dimensions.

Second, unless conditions warrant otherwise, switching between the full-motion and no-motion states should be progressive, utilizing the various intermediate states of a multiple-state switch. In most applications, a 4-state switch is adequate.

Third, the principal criterion used to control the switch is the visibility of the blurring due to the moving object. There are two parameters which affect this visibility: (1) the relative "contrast" of the object, or the difference in the objects's light level in comparison with the background light level, and (2) the velocity of motion. Blurring is not very visible for either a low-contrast object moving rapidly or for a high-contrast object moving very slowly. Conversely, blurring is very visible for a rapidly moving high-contrast object.

Of the two parameters, an object's relative contrast affects the visibility of blurring much more significantly that its velocity. An object's relative contrast is in turn affected by the difference in the amplitude of video signals representing the object and its background and in the light-emitting characteristics of the viewing screen. For example, it is well known that the light level of an object which is emitted from the viewing surface of a cathode ray tube is roughly proportional to the cube of the voltage of the signal which represents the object. A doubling in the difference in amplitude of signals for an object compared to its background will essentially multiply its relative contrast by eight, but a doubling in velocity will only double the visibility of blurring.

Details of how a multiple-state switch may be implemented or controlled are beyond the scope of the present invention. Additional details may be obtained by referring to the above incorporated U.S. Pat. No. 4,967,271.

PAL Implementation

For purposes of the present invention, PAL differs from NTSC in three significant ways. The most significant difference is the fact that the phase of the PAL chrominance subcarrier rotates by 90 degrees from frame to frame whereas the phase in NTSC rotates by 180 degrees from frame to frame. The second difference is that each frame in PAL comprises 625 scanning lines whereas each frame in NTSC comprises 525 lines. Finally, the third significant difference is the field rate; the PAL field rate is 50 Hz, but the NTSC field rate is 60 Hz.

Changes required to incorporate the present invention into a PAL system are fairly straight forward. Most significantly, for each one frame in NTSC, two frames are required in PAL; for each one line in NTSC, two lines are required in PAL.

Referring to FIG. 1, delays 103, 105 and 107 delay baseband chrominance information by a total of two frames or 1250 lines. Delays 103 and 107 each delay the chrominance information by 624 lines, and delay 105 delays the chrominance information by two lines.

The concepts and operation of the invention is substantially the same as that described above for an NTSC implementation. Switch 115 progressively switches between frame adder 113 which averages chrominance information across two frames and line adder 109 which averages chrominance information across two lines.

FIG. 2 is also applicable to PAL implementations except that the blocks in the figure should be interpreted differently. Blocks 201-204 represent PAL frames 1-4, respectively. Samples 210 and 216 are exactly two frames or 1250 lines apart. Samples 212 and 214 are two lines apart and are exactly midway between samples 210 and 216. As a result, the average time of the blurred information generated by adders 109 and 113 are aligned in time.

As is the case for NTSC, cross color suppression can be improved by using a LPF and a matching delay as shown in FIG. 3. The cutoff frequency of the LPF for PAL implementations is generally the same as that for NTSC implementations, or within the range from 500 to 700 kHz.

Good motion detection is more important for PAL implementations than for NTSC implementations because blurring caused by chrominance averaging is approximately 2.4 times greater in PAL than that caused in NTSC. This increase is due to the slower PAL field rate and the greater number of frames over which chrominance information is averaged or blurred.

Because blurring is much more visible in PAL, errors in motion detection are much more visible. As a result, the line-averaging or motion mode is favored more in PAL implementations than it is in NTSC implementations because the errors caused by incorrectly deciding that a moving object is stationary cannot be tolerated.

A simple motion detection scheme similar to that used in NTSC implementations as shown in FIG. 5 may also be used in PAL implementations. Chrominance motion detection in PAL is not very efficient, however, because a sequence of four frames is required to detect motion from chrominance information. There is rarely any information which correlates across four successive frames to permit the detection of motion, or the lack of motion.

Practical Implementation

FIG. 6 illustrates one implementation of part of a PAL television receiver incorporating the present invention to perform cross color suppression. The receiver comprises two parallel paths. The lower path includes a simple decoder 603 which demodulates the high-frequency portion of the spectrum into two baseband chrominance components u and v. Because of the simplicity of the decoder, cross color is assumed to be very heavy. Multiplexer 605 interleaves the u and v components into an alternating sequence of u and v component values and passes the multiplexed stream to cross color suppressor 609. Demultiplexer 609 extracts the u and v components and passes them to output processor 613 which in turn passes the output signal along path 615. In applications where an RGB output signal is desired, output processor 613 may comprise a matrix to combine the luminance and chrominance information received from the upper and lower paths. In another application, for example, output processor 613 is a line doubler.

Multiplexing of the baseband chrominance components u and v is not required to practice the present invention in PAL implementations just as multiplexing of I and Q or R−Y and B−Y components is not required for NTSC implementations. Each of the two chrominance components may be processed in separate parallel paths.

As shown in FIG. 6, the upper path includes comb filter 611 which separates luminance information from the input video signal received from path 601.

It should be appreciated that a high-quality receiver may be constructed using a decoder 603 and a comb filter 611 which are much simpler than the components performing the same functions in conventional high-quality television receivers because each is required to perform only one task. Fewer design compromises are required. The decoder can merely demodulate chrominance information, even with heavy amounts of cross color, and need not be concerned with luminance information. Similarly, the comb filter can merely extract luminance information and need not be concerned with accurate recovery of chrominance information. It should also be appreciated that the comb filter is not necessary to practice the present invention; however, care must be taken to insure that the luminance information experiences the same delay along the upper path that the chrominance information experiences along the lower path. In a practical implementation, the comb filter provides substantially the required amount of delay.

FIG. 6 does not show motion detection components. If used, the information from such detection may be passed to either or both the comb filter and the cross color suppressor to allow them to adapt their operation.

The implementation shown in FIG. 6 is equally applicable to NTSC signals and to embodiments utilizing complex decoders. The present invention simplifies the task of designing a complex decoder because errors in the u and v components are more tolerable. Design compromises which favor more accurate recovery of luminance information may be made; cross color can be corrected separately.

The foregoing are intended only to serve as examples of applications utilizing the present invention. Other implementations and applications of the present invention will be apparent to one skilled in the art.

I claim:

1. In a quadrature-amplitude modulated subcarrier color television receiver receiving a composite color television signal, apparatus for suppressing cross color in the television picture produced by said receiver, comprising chroma demodulator means for providing demodulated baseband chroma in response to said composite color television signal, motion detector means for detecting motion in the received television signal, inter-frame means for deriving inter-frame signal samples from said demodulated baseband chroma in successive television frames by averaging or recirculation techniques, intra-field means for deriving intra-field signal samples from said demodulated baseband chroma in successive television lines by averaging or recirculation techniques, selection means for selecting a combination of inter-field signal samples and intra-field signal samples in response to motion detected by said motion detector means.

2. Apparatus according to claim 1 wherein said quadrature-amplitude modulation conforms to the NTSC standard and wherein said inter-frame signal samples are derived from two adjacent television frames and said intra-field signal samples are derived from two adjacent television lines.

3. Apparatus according to claim 1 wherein said quadrature-amplitude modulation conforms to the PAL standard and wherein said inter-frame signal samples are derived from two television frames spaced apart by two frames and said intra-field signal samples are derived from two television lines spaced apart by two lines.

4. Apparatus according to claim 1 wherein said inter-frame means derives inter-frame signal samples by averaging samples of demodulated baseband chroma in successive television frames and said intra-field means derives intra-field signal samples by averaging samples of demodulated baseband chroma in successive television lines.

5. Apparatus according to claim 4 wherein corresponding inter-frame signal samples and inter-frame signal samples are substantially aligned in the horizontal, vertical and time domains.

6. Apparatus according to claim 1 wherein said selection means has two states, selecting said intra-field signal samples when said motion detector means detects motion in said television picture and selecting said inter-frame signal samples when said motion detector means does not detect motion in said television picture.

7. Apparatus according to claim 1 wherein said selection means operates as a fader having a multiplicity of states each generating a weighted sum of said intra-field signal samples and said inter-frame signal samples, wherein said selection means assumes one of said multiplicity of states which weights intra-field signal samples more heavily and weights said inter-frame signal samples less heavily as said motion detector detects increasing amounts of motion in said television picture.

8. Apparatus according to claim 1 wherein said chroma demodulator means provides two demodulated baseband chroma components, each in a separate path, and wherein each of said inter-frame means and intra-field means processes the respective baseband chroma components in separate paths.

9. Apparatus according to claim 1 wherein said chroma demodulator means provides two demodulated baseband chroma components in a time-multiplexed signal stream.

10. Apparatus according to claim 1 wherein said inter-frame means, said intra-field means and said selection means are implemented using digital techniques.

11. Apparatus according to claim 1 wherein said inter-frame means and said intra-field means each includes low-pass filter means.

12. In a quadrature-amplitude modulated subcarrier color television receiver receiving a composite color television signal, a method for suppressing cross color in the television picture produced by said receiver, comprising chroma demodulating said composite color television signal to provide demodulated baseband chroma, detecting motion in the received television signal, deriving inter-frame signal samples from said demodulated baseband chroma in successive television frames by averaging or recirculation techniques, deriving intra-field signal samples from said demodulated baseband chroma in successive television lines by averaging or recirculation techniques, selecting a combination of inter-field signal samples and intra-field signal samples in response to detected motion.

13. A method according to claim 12 wherein said quadrature-amplitude modulation conforms to the NTSC standard and wherein said inter-frame signal samples are derived from two adjacent television frames and said intra-field signal samples are derived from two adjacent television lines.

14. A method according to claim 12 wherein said quadrature-amplitude modulation conforms to the PAL standard and wherein said inter-frame signal samples are derived from two television frames spaced apart by two frames and said intra-field signal samples are derived from two television lines spaced apart by two lines.

15. A method according to claim 12 wherein said inter-frame signal samples are derived by averaging samples of demodulated baseband chroma in successive television frames and said intra-field signal samples are derived by averaging samples of demodulated baseband chroma in successive television lines.

16. A method according to claim 15 wherein corresponding inter-frame signal samples and inter-frame signal samples are substantially aligned in the horizontal, vertical and time domains.

17. A method according to claim 12 wherein intra-field signal samples are selected when motion in the television picture is detected and inter-frame signal samples are selected when no motion in the television picture is detected.

18. A method according to claim 12 wherein a combination of inter-field signal samples and intra-field signal samples are selected in response to detected motion by selecting one of a multiplicity of combinations of weighted sums of intra-field signal samples and inter-frame signal samples, wherein the multiplicity of combinations weights intra-field signal samples more heavily and the inter-frame signal samples less heavily in response to increasing motion in the television picture.

19. A method according to claim 12 wherein the composite color television signal is chroma demodulated to provide two demodulated baseband chroma components, each in a separate path, and wherein each of said inter-frame signal samples and intra-field signal samples are derived from the respective chroma components in the separate paths.

20. A method according to claim 12 wherein the composite color television signal is chroma demodulated to provide two demodulated baseband chroma components in a time-multiplexed signal stream.

21. Method according to claim 12 wherein deriving inter-frame signal samples from successive television frames by averaging or recirculation techniques and deriving intra-field signal samples from successive television lines by averaging or recirculation techniques each includes low-pass filtering.

* * * * *